United States Patent [19]

Kuhlmann et al.

[11] Patent Number: 4,528,753
[45] Date of Patent: Jul. 16, 1985

[54] RECIPROCATING SAW HOLDER AND HOUSING

[75] Inventors: Gerhard Kuhlmann; Bernhard Remmele, both of Stuttgart, Fed. Rep. of Germany

[73] Assignee: Robert Bosch GmbH, Stuttgart, Fed. Rep. of Germany

[21] Appl. No.: 540,613

[22] Filed: Oct. 7, 1983

[30] Foreign Application Priority Data

Dec. 8, 1982 [DE] Fed. Rep. of Germany ....... 3245359

[51] Int. Cl.³ .............................................. B27B 19/08
[52] U.S. Cl. ...................................... 30/392; 83/698; 279/80; 279/82; 403/322
[58] Field of Search .................. 30/392–394, 30/337, 338; 83/698; 403/321, 322, 361; 279/1 R, 9 R, 79, 80, 82, 83, 89, 90, 93

[56] References Cited

U.S. PATENT DOCUMENTS

| 691,449 | 1/1902 | Craig | 279/80 |
| 2,465,309 | 3/1949 | Happe et al. | 279/82 X |
| 2,621,685 | 12/1952 | Butz | 83/698 X |
| 2,739,361 | 3/1956 | Elsner | 403/322 X |
| 3,750,283 | 8/1973 | Hoffman | 30/337 X |
| 3,971,132 | 7/1976 | Griffies et al. | 30/393 |

FOREIGN PATENT DOCUMENTS 681687 10/1932 United Kingdom ................. 279/93

Primary Examiner—Douglas D. Watts
Attorney, Agent, or Firm—Michael J. Striker

[57] ABSTRACT

In a motor-driven hand-held saw, the end of the reciprocating rod is clamped with the shaft of the saw blade in a locking sleeve which is displaced between a locked and released position along the elongation of the reciprocating rod and is operated from outside of a protective shield which surrounds the end of the reciprocating rod and the shaft of the saw blade connected to each other by the locking sleeve.

12 Claims, 8 Drawing Figures

RECIPROCATING SAW HOLDER AND HOUSING

BACKGROUND OF THE INVENTION

The present invention relates to saws, and more particularly to hand-held motor-driven compass saws.

Motor-driven compass saws of the type under consideration have been known in the art. Such saws have been disclosed, for example in German patent publications DE-OS Nos. 25 00 788, 27 53 500 and 30 06 299. Such a saw is also described in DE-Gbm No. 77 10558. A clamping of the saw blade on the end of the reciprocating shaft has been obtained in these known constructions by connecting the saw blade to that end in a rotary clamping member and clamping them by means of clamping bolts, screw caps or other suitable fastening means.

Manufacturing and operation expenses involved with these conventional saws have been considerably high. Furthermore, in these known saw arrangements, the end of the reciprocating shaft has been exposed and accessible to the hands of the operator. The utilization of protective shields, which would surround the saw blade and the end of the reciprocating rod, has always caused some difficulties. Known holding arrangements for holding the saw blade have prevented the improvements in protective shields.

SUMMARY OF THE INVENTION

It is an object of the invention to provide an improved motor-driven saw.

It is a further object of the present invention to provide a saw which is easy to manufacture and which is fast and reliable in operation.

It is another object of the invention to provide an improved protective shield for protection of the hands of the operator from contact with the reciprocating rod and the shaft of the saw blade.

These and other objects of the invention are attained by a motor-driven hand-held compass saw, comprising an elongated reciprocating rod having an end portion; and holding means on said end portion for holding an end of a flat saw blade, said end portion having a flat cross-section as viewed in the direction of advancing of the saw, said end portion being formed with a pocket for receiving the end of the saw blade, said holding means including a locking sleeve surrounding said end portion and slidable thereon in the direction of elongation of said rod for locking the end of the saw blade in said pocket.

The saw blade may be formed with at least one projection outwardly extended therefrom, said end portion being formed with at least one recess adapted to receive said projection and provide a form-locking connection between the saw blade and said end portion in the direction of movement of the saw blade when the end of the saw blade is inserted into said pocket transversally to the direction of the movement of the saw blade and said locking sleeve is allowed to be displaced from a released position on said end portion to a locked position in which it locks the end portion of said reciprocating rod against a transversal movement.

The saw may further include a protective shield surrounding said end portion with the saw blade locked thereto, and a work plate, said shield extending approximately up to said work plate. The shield may be provided with an elongated slot which extends in the direction of elongation of the saw blade to enable an operator to observe a cut made by the saw blade.

The above mentioned pocket in the end of the rod makes it possible that the slidable locking sleeve may be displaced back and forth to lock or release the saw blade from the outside of the protective shield.

Means for displacing the slidable locking sleeve from the outside of the protective shield may include a locking slide adapted to slide along the slot formed in the shield, whereby the protective shield serves as a guide for the displacement of the locking sleeve.

The provision of the protective shield excludes a potential danger to the operators's hands.

The locking slide may include a handle and a follower pin extended from said handle through said slot towards said locking sleeve and engageable with said locking sleeve.

In accordance with further features of the invention the locking slide may further include a spring which permanently urges said follower pin to a position, in which said follower pin is detached from said locking sleeve.

Furthermore, the locking sleeve may be formed with a projecting portion extended in said advancing direction, said projecting portion being provided with means for coupling said sleeve with said handle.

The coupling means may include a hole formed in the projecting portion, said follower pin being engageable in said hole.

The locking sleeve may have a bore extended perpendicularly to the elongation of said reciprocating rod, said holding means further including a ball accommodated in said bore and a spring located in said bore and urging said ball towards the end portion of the reciprocating rod, and a locking plate connected to said sleeve and supporting said spring in said bore.

Furthermore, the saw may include a guide bearing in which said end portion with the flat cross-section is guided so that the end portion of said reciprocating rod and the end of the saw blade are aligned with each other in said advancing movement.

The pocket formed in the end portion of the rod may be open either from the wide side of the rod or from its narrow side.

The holding means may further include a leaf spring located in the pocket.

The holding means may also include a pivotable grip member which is engageable in a bearing depression formed in the end portion of the rod.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
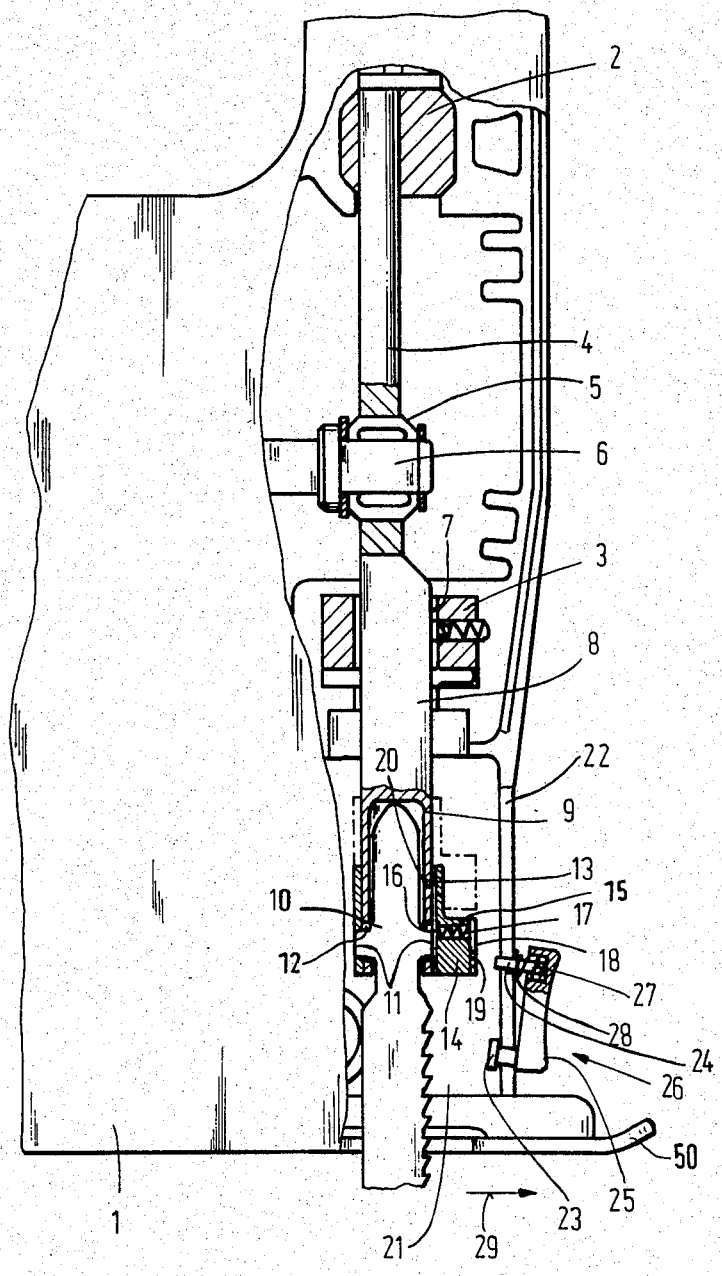
FIG. 1 is a side view of the compass saw, partially in section, according to a first embodiment of the invention, with a locking sleeve in the lower position.

Referring first to FIG. 1 it is seen that a motor-driven compass saw according to the invention includes a saw housing 1 in which a reciprocating rod 4, reciprocated in the conventional manner by the motor, is mounted in two bearings, of which the upper bearing 2 is spaced from the lower bearing 3 along the longitudinal axis of reciprocating rod 4. The latter has a coulisse 5 in which an eccentric stud 6 is engaged. The lower bearing 3 has a rectangular guide opening 7, the cross-section of which corresponds to that of the end 8 of reciprocating rod 4. The flat end of the reciprocating rod, which is to be connected to the saw blade, is formed with a pocket 9 which is closed at the three sides thereof by the walls of the end portion of the reciprocating rod. This pocket serves for receiving and clamping therein an end 10 of the saw blade. The latter is formed with two opposing pins or projections 11. Recesses 12 corresponding in shape to the projections 11 are provided in the narrower walls of pocket 9. It is, of course, understood that the cross section of pocket 9 corresponds to that of the end 10 of the saw blade. Reference numeral 29 designates the direction of advancing of the saw blade during the operation. Reference character 50 denotes a work plate or guide shoe.

A locking sleeve 13 which surrounds the end 8 of the reciprocating rod at all sides thereof is slidably positioned on that end. Locking sleeve 13 is formed with a projection 14 which extends in the direction of movement of the blade shown by arrow 29. Projection 14 is provided with a bore 15 which extends perpendicularly to the reciprocating rod 4. A ball 16 is positioned in bore 15, which ball is biased by a spring 17. A locking plate 18 which is glued or otherwise rigidly connected to the end face of projection 14 serves as a support for spring 17. Plate 18 in turn is formed with a hole or perforation 19 the function of which will be explained herein below.

Figure 2:
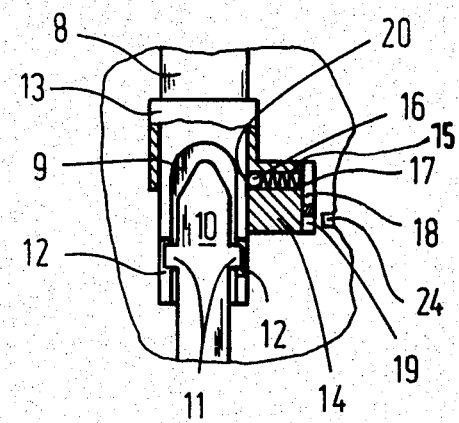
FIG. 2 is a detail of FIG. 1, but with the locking sleeve in the upper position.

As shown in FIG. 2, the end 8 of the reciprocating rod 4 is formed with a depression 20 which is adapted to engage ball 16 when the locking sleeve 13 is in its upper position, as illustrated in FIG. 2. In the lower position of the locking sleeve 13, shown in FIG. 1, ball 16 located in bore 15 is engaged with one of projections 11 accommodated in the recess 12 which faces the bore 15.

In order to facilitate assembling of the saw blade with the reciprocating rod and for locking ball 16 in the bore 15 it is expedient that bore 15 be slightly tapered at its end directed inwardly towards the blade. Thereby ball 16 is held within bore 15 before the respective recess 12 comes into the position opposite to the ball and before it abuts against the projection 11 of the saw blade.

The end portion 8 of the reciprocating rod 4 and the end portion 10 of the saw blade are surrounded by a shield 21 which has an elongated slot 22. The latter extends along the elongation of the saw blade and serves to enable an operator to observe cuts made by the saw. Furthermore, slot 22 serves as a guiding means for guiding therein a setbolt 23 and a follower pin 24.

Both the setbolt 23 and the follower pin 24 are secured to an operating handle 25 and form with this operating handle a locking slide denoted as 26. A spring 27 and a washer 28 are slidably mounted on the follower pin 24. Thereby spring 27 is supported between the washer 28 and the inner wall of the handle 25. Spring 27 permanently urges washer 28 against shield 21 and at the same time urges the handle 25 away from shield 21. If no operating pressure is applied to handle 25 follower pin 24 remains engaged in the hole or perforation 19 formed in the locking plate 18 so that locking sleeve 13 can be slidably moved. A leaf spring 30 which faces the open wider side of pocket 9 is inserted into locking sleeve 13.

For operation with the saw blade an operator presses the front side of the handle 25 unless the follower pin 24 is engaged in the perforation 19 in the locking sleeve 13. The latter is then together with the locking slide 26 displaced upwardly to the position, in which ball 16 is arrested in depression 20. Pocket 9 is now accessible for the insertion therein of the saw blade end 10, the latter being inserted into pocket 9 unless projections 11 are engaged within respective recesses 12. Then locking sleeve 13, also with the aid of the locking slide 26, is pulled in the downward direction. This latter displacement takes place unless ball 16 is arrested in the respective recess 12 facing the bore 15. The end 10 of the saw blade is now secured and the relatively strong leaf spring 30 compensates for any play between the saw blade end and the walls of the pocket 9. The handle 25 is released and the saw is prepared to operation. The hands of the operator are now protected from contact with all movable components of the saw located above the workpiece.

The second embodiment of the invention will be described with reference to FIGS. 4 and 5. In this embodiment the end portion of the reciprocating rod designated by 31 has a pocket 32 which is open at the narrower side thereof. The locking sleeve 13 is only slightly modified in that in this case a narrow leaf spring 34 is utilized instead of leaf spring 30, leaf spring 34 being inserted from the narrow side of the pocket. Only one recess 35 is formed at the end portion 31 of the reciprocating rod in place of two opposing recesses 12. Only one projection 11 is engaged in recess 35.

Figure 4:
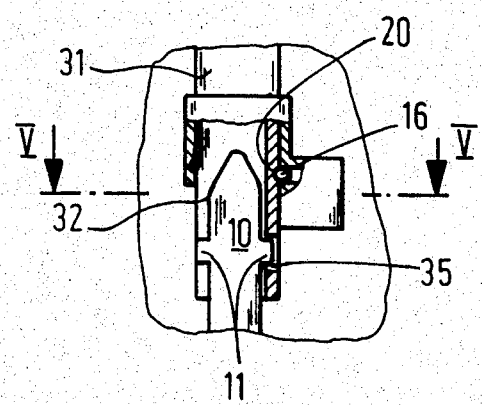
FIG. 4 is a partial sectional view similar to FIG. 2, but of another embodiment of the invention.
Figure 5:
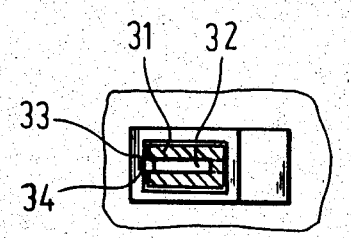
FIG. 5 is a sectional view on line V—V of FIG. 4.
Figure 3:
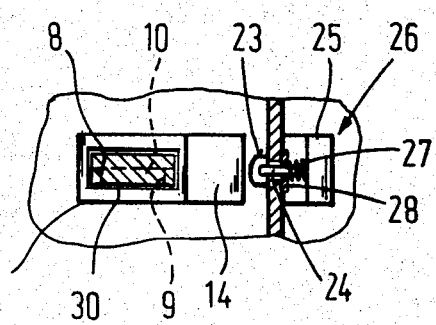
FIG. 3 is a sectional view on line III—III of FIG. 2.

The remaining part of the locking arrangement of the embodiment of FIGS. 4 and 5 as well as its operation are similar to those shown in and described for FIGS. 1-3. The insertion of the end 10 of the saw blade into pocket 32 is carried out in this second embodiment not through the plane which is transversal to the plane of the saw blade as is the case in the embodiment of FIGS. 1-3, but along the surface of the saw blade. The end 10 of the saw blade is inserted into pocket 32 from behind.

Figure 6:
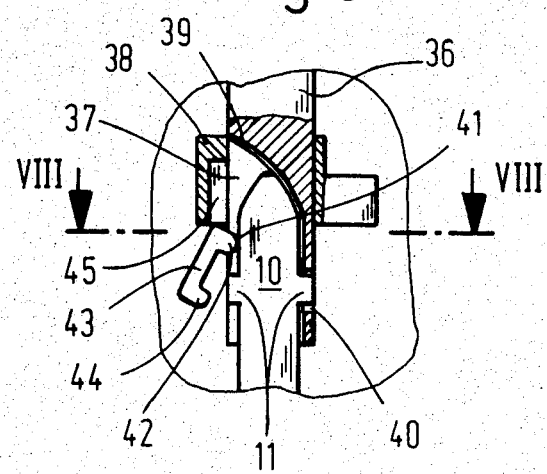
FIG. 6 is a partial sectional view similar to FIG. 2, but of still another embodiment of the invention, with the locking sleeve in the released position.
Figure 7:
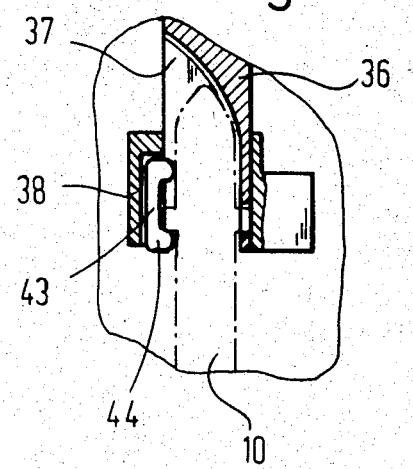
FIG. 7 is a sectional view similar to FIG. 6 but with the locking sleeve in the locked position.
Figure 8:
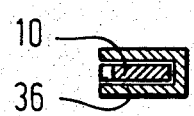
FIG. 8 is a sectional view on line VIII—VIII of FIG. 6.

In the embodiment depicted in FIGS. 6 through 8, the end portion 36 of the reciprocating rod has a pocket 37 and is surrounded by a locking sleeve 38. Pocket 37 has a supporting edge 39 which has a V-shape. This edge should therefore center the end 10 of the saw blade within the pocket. Only one recess 40 for receiving therein only one projection 11, similarly to the embodiment of FIGS. 4 and 5, is provided in the end portion 36 of the reciprocating rod. Pocket 37 is open at its narrower side in the manner similar to that of the embodiment of FIGS. 4 and 5. Adjacent walls of the end portion 36 of the reciprocating rod at the opening of pocket 37 are formed with depressions 41. Each depression serves to engage an upper projection 42 of a grip member 43. The latter also has a lower projection 44. A recess 45 is formed in the locking sleeve 38, which recess is adapted to receive the grip member 43 when the locking sleeve 38 is displaced on the end portion 36 in the downward direction. Upon the insertion of the end of the saw blade into the pocket 37 and pulling sleeve 38 in the downward direction projection 44 abuts against one of the projections 11 of the saw blade and presses the saw blade end into pocket 37. Recess 40 additionally supports another projection 11 (FIG. 6). The remaining components as well as the operation of the locking sleeve 38 are similar to those described for FIGS. 1 through 3. Due to the utilization of grip member 43 a particularly short displacement of the locking sleeve for clamping thereof on the end of the saw blade and disconnecting thereof from the saw blade can be realized.

In all the embodiments, the end 10 of the saw blade inserted into the pocket is locked by locking sleeve 13 so that the latter is displaceable on the end 8 (or 31 or 36) of the reciprocating rod from its released position to its locked position and back, namely between arresting points 16, 20 and 16, 12. This fashion of clamping makes it possible that a quick switching of the compass saw form exchanging the saw blade can be achieved. The slide 26 located in slot 22 of shield 21, which serves for exchanging of a saw blade, remains inoperative during the operation of the saw blade.

It will be understood that each of the elements described above, or two or more together, may also find a useful application in other types of compass saw 5 differing from the types described above.

While the invention has been illustrated and described as embodied in a motor-driven hand held compass saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A saw, particularly, a motor-driven hand-held compass saw, comprising an elongated reciprocating rod having an end portion; holding means on said end portion for holding an end of a flat saw blade, said end portion having a flat cross-section as viewed in the direction of advancing of the saw, said end portion being formed with a pocket for receiving the end of the saw blade, said holding means including a locking sleeve surrounding said end portion and slidable thereon in the direction of elongation of said rod for locking the end of the saw blade in said pocket or releasing the end of the saw blade from the end portion of said rod; a protective shield surrounding said end portion with the saw blade locked thereto; a work plate, said shield extending approximately up to said work plate and being provided with an elongated slot which extends in the direction of elongation of the saw blade to enable an operator to observe a cut made by the saw blade; and means for displacing said slidable locking sleeve from outside of the protective shield, said displacing means including a locking slide adapted to slide along said elongated slot, said locking slide including a handle and a follower pin extended from said handle through said slot towards said locking sleeve and engageable with said locking sleeve.

2. The saw as defined in claim 1, wherein said saw blade is formed with at least one projection outwardly extended therefrom, said end portion being formed with at least one recess adapted to receive said projection and provide a form-locking connection between the saw blade and said end portion in the direction of movement of the saw blade when the end of the saw blade is inserted into said pocket transversally to the direction of the movement of the saw blade and said locking sleeve is allowed to be displaced from a released position on said end portion to a locked position in which it locks the end portion of said reciprocating rod against a transversal movement.

3. The saw as defined in claim 1, wherein said locking slide further includes a spring which permanently urges said follower pin to a position in which said follower pin is detached from said locking sleeve.

4. The saw as defined in claim 3, wherein said locking sleeve is formed with a projecting portion extended in said advancing direction, said projecting portion being provided with means for coupling said sleeve with said handle.

5. The saw as defined in claim 4, wherein said coupling means includes a hole formed in said projecting portion, said follower pin being engageable in said hole.

6. The saw as defined in claim 1, said locking sleeve having a bore extended perpendicularly to the elongation of said reciprocating rod, said holding means further including a ball accommodated in said bore and a spring located in said bore and urging said ball towards the end portion of the reciprocating rod, and a locking plate connected to said sleeve and supporting said spring in said bore.

7. The saw as defined in claim 1, further including a guide bearing in which said end portion with the flat cross-section is guided so that the end portion of said reciprocating rod and the end of the saw blade are aligned with each other in said advancing movement.

8. The saw as defined in claim 1, wherein said flat cross section is rectangular.

9. The saw as defined in claim 8, wherein said pocket is open at the wide side of said end portion.

10. The saw as defined in claim 8, wherein said pocket is open at the narrow side of said end portion.

11. The saw as defined in claim 1, wherein said holding means further include a leaf spring located in said pocket and facing an open side of said pocket.

12. The saw as defined in claim 1, wherein said holding means further include a pivotable grip member, said end portion being formed with a bearing depression with which said grip member is engageable.

* * * * *